United States Patent
Mustapha et al.

(10) Patent No.: US 8,955,923 B2
(45) Date of Patent: Feb. 17, 2015

(54) ARRANGEMENT, METHOD AND DEVICE FOR INFLUENCING A YAWING MOMENT IN A MOTOR VEHICLE

(75) Inventors: Adnan Mustapha, Maulbronn (DE); Dieter Woerner, Eppingen (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 1815 days.

(21) Appl. No.: 10/581,504

(22) PCT Filed: Dec. 3, 2004

(86) PCT No.: PCT/EP2004/013763
§ 371 (c)(1),
(2), (4) Date: Aug. 15, 2008

(87) PCT Pub. No.: WO2005/054023
PCT Pub. Date: Jun. 16, 2005

(65) Prior Publication Data
US 2008/0296969 A1 Dec. 4, 2008

(30) Foreign Application Priority Data
Dec. 4, 2003 (DE) .................................. 103 56 673

(51) Int. Cl.
*B60T 8/60* (2006.01)
*B60T 8/1764* (2006.01)
*B60T 8/1755* (2006.01)

(52) U.S. Cl.
CPC .............. *B60T 8/1764* (2013.01); *B60T 8/1755* (2013.01)
USPC ............ 303/146; 303/148; 303/149; 303/155; 303/159

(58) Field of Classification Search
USPC ........................... 303/146, 159, 155, 148, 149
See application file for complete search history.

(56) References Cited

U.S. PATENT DOCUMENTS

| | | | | |
|---|---|---|---|---|
| 3,658,388 A | * | 4/1972 | Hasegawa | 303/171 |
| 3,838,889 A | * | 10/1974 | Miller | 303/173 |
| 4,229,049 A | * | 10/1980 | Ando | 303/9.63 |
| 4,418,966 A | * | 12/1983 | Hattwig | 303/198 |
| 4,421,362 A | * | 12/1983 | Shirai et al. | 303/115.4 |
| 4,480,876 A | * | 11/1984 | Sato et al. | 303/175 |
| 4,547,022 A | * | 10/1985 | Brearley et al. | 303/9.74 |
| 4,637,664 A | * | 1/1987 | Arikawa | 303/187 |
| 4,640,557 A | * | 2/1987 | Panizza et al. | 303/155 |

(Continued)

FOREIGN PATENT DOCUMENTS

| | | |
|---|---|---|
| DE | 195 45 001 | 6/1997 |
| DE | 196 19 381 | 11/1997 |

(Continued)

*Primary Examiner* — Robert A Siconolfi
*Assistant Examiner* — James Hsiao
(74) *Attorney, Agent, or Firm* — Kenyon & Kenyon LLP

(57) ABSTRACT

A brake system for a motor vehicle, in particular for a utility vehicle, with a device for reducing the yawing moment on the front axle of the vehicle, characterized in that a device for measuring the slip and/or a device for measuring the load on the rear axle or on two running wheels of the rear axle of the vehicle arranged on sides opposite one another is present and a regulating or control device for influencing the brake pressure on the front wheels is present which limits the brake pressure on the front wheels depending on the measured slip and/or depending on the measured load on the rear axle or on the running wheels of the rear axle, the regulating or control device multiplying the difference of the brake pressures on the front wheels by a value which is smaller than 1.

18 Claims, 1 Drawing Sheet

(56) References Cited

U.S. PATENT DOCUMENTS

| | | | |
|---|---|---|---|
| 4,733,921 A * | 3/1988 | Farr | 303/149 |
| 4,740,040 A * | 4/1988 | Arikawa | 303/159 |
| 4,783,126 A | 11/1988 | Arikawa | |
| 4,872,729 A * | 10/1989 | Arikawa | 303/149 |
| 5,011,235 A * | 4/1991 | Arikawa | 303/149 |
| 5,134,352 A * | 7/1992 | Matsumoto et al. | 318/587 |
| 5,136,510 A * | 8/1992 | Beck | 701/70 |
| 5,328,256 A | 7/1994 | Ohta et al. | |
| 5,488,555 A * | 1/1996 | Asgari et al. | 701/41 |
| 5,772,289 A * | 6/1998 | Nakazawa et al. | 303/9.69 |
| 5,944,394 A * | 8/1999 | Friederichs et al. | 303/148 |
| 6,044,319 A * | 3/2000 | Rosendahl et al. | 701/71 |
| 6,749,271 B1 | 6/2004 | Mayr-Froehlich et al. | |
| 6,880,900 B2 * | 4/2005 | Hara et al. | 303/170 |
| 6,918,638 B2 * | 7/2005 | Schneider et al. | 303/140 |
| 6,923,514 B1 * | 8/2005 | Spieker et al. | 303/199 |
| 7,072,755 B2 * | 7/2006 | Mahlo et al. | 701/71 |
| 2003/0052536 A1 * | 3/2003 | Schneider et al. | 303/146 |
| 2004/0138803 A1 * | 7/2004 | Mahlo et al. | 701/71 |

FOREIGN PATENT DOCUMENTS

| | | |
|---|---|---|
| DE | 199 39 035 | 3/2001 |
| GB | 2 323 138 | 9/1998 |
| JP | 50-33370 | 3/1975 |
| JP | 01-114563 | 5/1989 |
| JP | 3-86665 | 4/1991 |
| JP | 4-78644 | 3/1992 |
| JP | 4-221263 | 8/1992 |
| JP | 6-344884 | 12/1994 |
| JP | 09-175367 | 7/1997 |
| JP | 09-202225 | 8/1997 |
| JP | 9202225 A | 8/1997 |
| JP | 2003-306053 | 10/2003 |

* cited by examiner

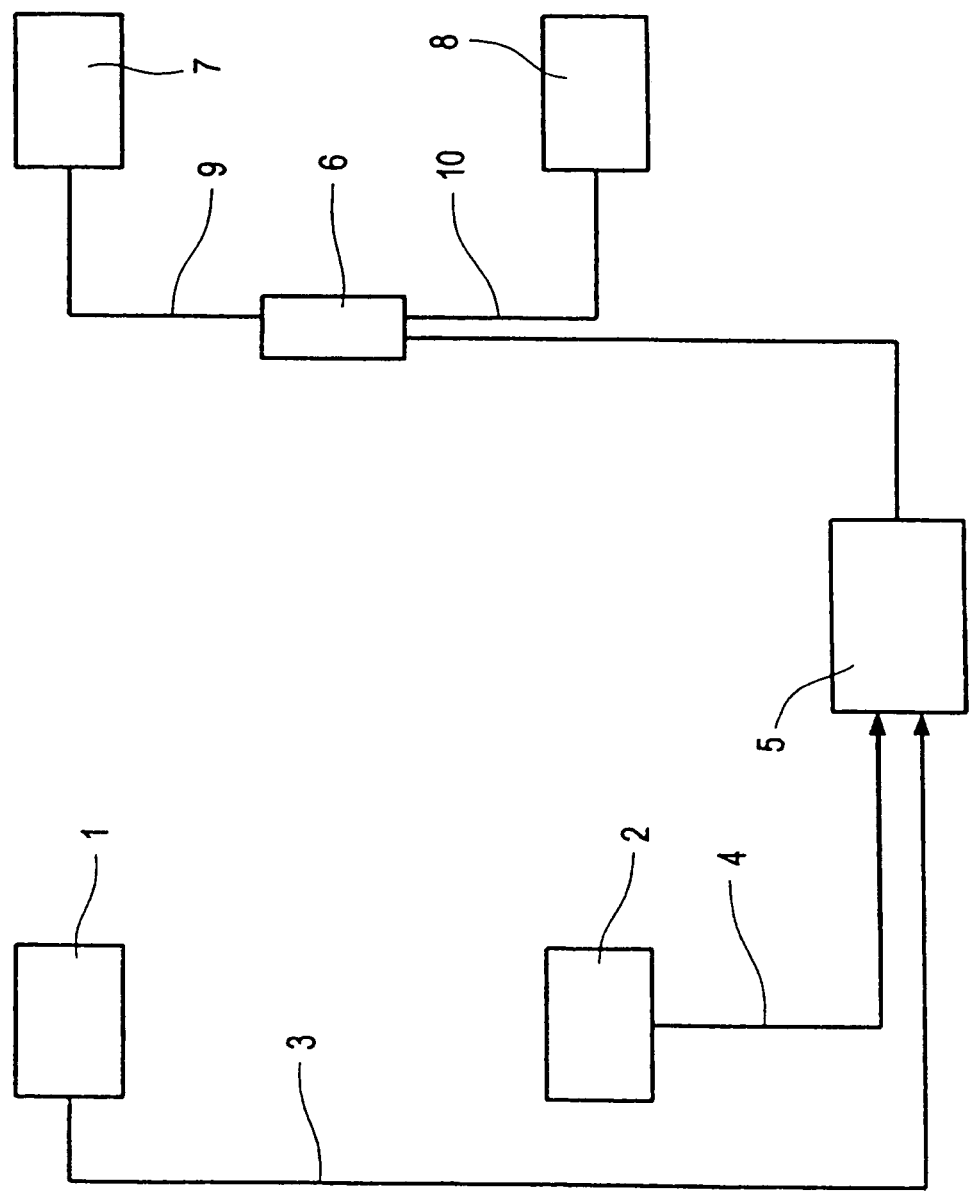

ARRANGEMENT, METHOD AND DEVICE FOR INFLUENCING A YAWING MOMENT IN A MOTOR VEHICLE

FIELD OF THE INVENTION

The present invention relates to a brake system for a motor vehicle, in particular for a utility vehicle, with a device for reducing the yawing moment on the front axle of the vehicle.

BACKGROUND INFORMATION

Modern electronic vehicle brake systems, such as ABS or EBS brake systems, have a device for reducing yawing moments on the front axle in order to make the vehicle controllable on µ split as well. Fundamentally, yawing moments, which are brought about by different rolling friction or static friction between the running wheels of a vehicle and the surface on which it moves, lead to the vehicle deviating laterally from the desired direction of travel. Yawing moments can lead to the vehicle skidding in particular during braking in bends.

Efforts are therefore made always to ensure sufficient vehicle stability in the development of brake systems, for example pneumatic, hydraulic or hydraulic/pneumatic brake systems, and to stabilize the vehicle by adapted brake pressures. The pressure difference permissible on a vehicle axle between the brake cylinders for the running wheels of this axle is as a rule a compromise between controllability and steerability of the vehicle. It is generally the case that an empty vehicle with a short wheelbase is more critical to control than a vehicle with a long wheelbase. As the pressure difference between the brake cylinders concerned which is permissible in a brake system used in various vehicle types has to be geared to the critical vehicle type, the possible brake pressures are not utilized in a vehicle with a long wheelbase when this brake system is used.

A brake system for vehicles, in particular for utility vehicles, in which a sensor is provided for sensing a physical quantity which occurs when a brake pressure defined by the driver is applied, is discussed in German Patent Document No. 199 39 035 A1, for example. In this brake system, a hydraulic/pneumatic converter is provided, which is connected to an ABS valve and converts a brake pressure applied pneumatically to the converter into a hydraulic brake pressure for a vehicle brake. The sensor is integrated into the converter and responds and generates a warning signal when a pneumatic piston of the converter is in a stop position when the pneumatic/hydraulic converter is ventilated.

U.S. Pat. No. 4,872,729 discusses a brake system for a motor vehicle with a device for measuring the slip on the rear axle and a control device for influencing the brake pressure on the front wheels which limits the brake pressure on the front wheels depending on the measured slip on the rear axle.

SUMMARY OF THE INVENTION

An object of the exemplary embodiment and/or exemplary method of the present invention is to improve a brake system of the kind mentioned in the introduction in such a way that driving safety is increased by a reduction of the yawing moment.

According to the exemplary embodiment and/or exemplary method of the present invention, this object is achieved in that a device for measuring the slip and/or a device for measuring the load on the rear axle or on two running wheels of the rear axle of the vehicle arranged on sides opposite one another is present and a regulating or control device for influencing the brake pressure on the front wheels is present which limits the brake pressure on the front wheels depending on the measured slip and/or depending on the measured load on the rear axle or on the running wheels of the rear axle, the regulating or control device multiplying the difference of the brake pressures on the front wheels by a value which is smaller than 1.

In this way, on the one hand the slip measured on the rear axle is taken into consideration for the braking behaviour of the front axle. On the other hand, with a high rear axle load, a high lateral guiding force is brought about, so that the permissible yawing moment on the front axle can be increased in comparison with an empty vehicle. This means that, with a low load on the rear axle, the permissible pressure difference of the running wheels on the front axle and thus the yawing moment on this axle is limited to a small value.

The smaller the load on the rear axle, the smaller the factor is. With a load corresponding to 100% of maximum load, a load factor of 1 is obtained. With a lower load, correspondingly lower values are obtained.

In the case of control both based on measurement of the slip and also based on measurement of the load, the values for the permissible brake pressure difference on the front axle can also be obtained by interpolation.

BRIEF DESCRIPTION OF THE DRAWINGS

FIG. 1 shows a block diagram of a brake system for the exemplary embodiment and/or exemplary method of the present invention.

DETAILED DESCRIPTION

A vehicle has a rear axle with two running wheels on which a measuring unit 1, 2 is arranged in each case in order to measure the slip occurring on each of the two running wheels.

The values measured by the measuring units 1, 2 are conveyed to a regulating or control unit 5 via data lines 3, 4. From the values received, this unit generates a maximum value for the pressure difference still permissible on the front wheels and conveys this value to a measuring unit 6 to which the pressure values of brake cylinders 7, 8 on the front wheels are supplied.

From the pressure difference and/or the values measured in each case on the brake cylinders 7, 8, the regulating or control device 5 determines the maximum pressure permissible in each case for each brake cylinder 7, 8 or defines reduced values for each individual brake cylinder 7, 8 which are in each case conveyed either via the measuring unit 6 or directly to the brake cylinders 7, 8.

Instead of obtaining the values for the slip on the two running wheels of the rear axle, it is also sufficient in a simpler embodiment merely to measure the slip from the rear axle itself.

Interpolation may be used to store values for maximum permissible pressure differences on the front axle in a table, and thus to fix them, for all possible slip values on the rear axle.

Instead of slip measurement on the rear axle of the vehicle, the axle loads concerned may be determined and to derive therefrom values for the permissible pressure differences on the brake cylinders 7, 8 of the front axle.

In the same way, the values for the slip and for the load may be linked with one another and to generate therefrom a permissible pressure difference for the front brake cylinders 7, 8. In this connection, tables of values can be drawn up, according to which the pressures in the brake cylinders 7, 8 are fixed at in each case maximum permissible values.

In practice, the time intervals of the slip measurements can also be standardized in a situationally adapted way, or fixed tables are input for each vehicle and for each measuring device so as always to ensure the safety of the vehicle even on changing surfaces.

The invention claimed is:

1. A brake system for a motor vehicle, comprising:
   a device for reducing a yawing moment on a front axle of the vehicle;
   at least one of a device for measuring a slip and a device for measuring a load on a rear axle or on two running wheels of the rear axle of the vehicle arranged on sides opposite one another;
   a control device operable to determine a maximum value for a difference of the brake pressures on the front wheels depending on at least one of a measured slip and of a measured load on the rear axle or on the running wheels of the rear axle, wherein the control device is also operable to limit a permissible pressure difference of the front wheels on the front axle, so that the yawing moment on the front axle is limited, by multiplying the difference of the brake pressures on the front wheels by a value which is smaller than 1;
   a measuring device for measuring at least one of the brake pressure on each of the front wheels and the difference of the brake pressures on the front wheels;
   wherein the control device determines the maximum value for the difference of the brake pressures on the front wheels by interpolation based on both of the measured slip and the measured load,
   wherein maximum permissible values for the difference of the brake pressures on the front wheels are stored in a table by interpolation, and
   wherein the at least one of the device for measuring the slip and the device for measuring the load is configured to measure at least one of the slip and the load at standardized time intervals based on a driving situation.

2. The brake system of claim 1, wherein the motor vehicle is a utility vehicle.

3. A method for reducing a yawing moment on a front axle of a motor vehicle, the method comprising:
   measuring at least one of a slip and a load on a rear axle or on two running wheels of the rear axle of the vehicle arranged on sides opposite one another;
   determining a maximum value for a difference of the brake pressures on the front wheels depending on at least one of a measured slip and of a measured load on the rear axle or on the running wheels of the rear axle;
   limiting a permissible pressure difference of front wheels on the front axle, so that the yawing moment on the front axle is limited, by multiplying the difference of the brake pressures on the front wheels by a value which is smaller than 1;
   measuring at least one of the brake pressure on each of the front wheels and the difference of the brake pressures on the front wheels; and
   storing maximum permissible values for the difference of the brake pressures on the front wheels in a table by interpolation;
   wherein the maximum value for the difference of the brake pressures on the front wheels is determined by interpolation based on both of the measured slip and the measured load, and
   wherein the measuring of the at least one of the slip and the load is performed at standardized time intervals based on a driving situation.

4. The method of claim 3, wherein the motor vehicle is a utility vehicle.

5. The brake system of claim 1, wherein the control device is configured to determine a higher maximum value for the difference of the brake pressures on the front wheels based on a higher measured load.

6. The brake system of claim 1, wherein the control device is configured to determine a lower maximum value for the difference of the brake pressures on the front wheels based on a lower measured load.

7. The brake system of claim 1, wherein the control device is configured to determine the maximum value for the difference of the brake pressures on the front wheels by interpolation based on both of the measured slip and the measured load.

8. The brake system of claim 1, wherein the control device is configured to store the maximum permissible values for the difference of the brake pressures on the front wheels in a table by interpolation.

9. The brake system of claim 1, wherein the at least one of the device for measuring the slip and the device for measuring the load is configured to measure at least one of the slip and the load at standardized time intervals based on a driving situation.

10. The brake system of claim 1, wherein the control device is configured to determine a higher maximum value for the difference of the brake pressures on the front wheels based on a higher measured load.

11. The brake system of claim 1, wherein the control device is configured to determine a lower maximum value for the difference of the brake pressures on the front wheels based on a lower measured load.

12. The method of claim 3, wherein a higher maximum value for the difference of the brake pressures on the front wheels is determined based on a higher measured load.

13. The method of claim 3, wherein a lower maximum value for the difference of the brake pressures on the front wheels is determined based on a lower measured load.

14. The method of claim 3, wherein the maximum value for the difference of the brake pressures on the front wheels is determined by interpolation based on both of the measured slip and the measured load.

15. The method of claim 3, further comprising:
   storing maximum permissible values for the difference of the brake pressures on the front wheels in a table by interpolation.

16. The method of claim 3, wherein the measuring of the at least one of the slip and the load is performed at standardized time intervals based on a driving situation.

17. The method of claim 3, wherein a higher maximum value for the difference of the brake pressures on the front wheels is determined based on a higher measured load.

18. The method of claim 3, wherein a lower maximum value for the difference of the brake pressures on the front wheels is determined based on a lower measured load.

* * * * *